United States Patent [19]

Hancock et al.

[11] Patent Number: 4,855,579
[45] Date of Patent: Aug. 8, 1989

[54] SYSTEM FOR GUIDING A USER IN ORIENTING AN APPLICATION INSERT HAVING A PLURALITY OF DATASTRIPS RELATIVE TO A DATASTRIP READER

[75] Inventors: David Hancock; Robert Hoyt; Joseph Formica, all of Rochester, N.Y.

[73] Assignee: Eastman Kodak Company, Rochester, N.Y.

[21] Appl. No.: 138,468

[22] Filed: Dec. 28, 1987

[51] Int. Cl.$^4$ .............................................. G06K 7/00
[52] U.S. Cl. ................... 235/436; 235/456; 235/485; 235/486
[58] Field of Search ............... 235/436, 454, 456, 483, 235/485, 486; 364/709.08, 709.10, 709.11

[56] References Cited

U.S. PATENT DOCUMENTS

| | | | |
|---|---|---|---|
| 3,158,317 | 11/1964 | Alexander | 235/145 |
| 3,560,964 | 2/1971 | Bedell et al. | 340/365 |
| 4,119,839 | 10/1978 | Beckmann et al. | 235/145 R |
| 4,136,336 | 1/1979 | Abe et al. | 340/365 |
| 4,273,996 | 6/1981 | Weimer | 235/436 X |
| 4,274,081 | 6/1981 | Nomura et al. | 340/153 |
| 4,279,021 | 7/1981 | See et al. | 364/900 |
| 4,359,222 | 11/1982 | Smith et al. | 273/85 |
| 4,439,757 | 3/1984 | Gross et al. | 340/365 |
| 4,598,196 | 7/1986 | Pierce et al. | 235/454 |
| 4,631,700 | 12/1986 | Lepeyre | 364/900 |
| 4,692,603 | 9/1987 | Brass et al. | 235/454 |
| 4,695,991 | 9/1987 | Hudson | 235/456 X |
| 4,754,127 | 6/1988 | Brass et al. | 235/456 |

*Primary Examiner*—David L. Trafton
*Attorney, Agent, or Firm*—William F. Noval

[57] ABSTRACT

Digital data utilization apparatus includes a datastrip reader for reading digital data encoded on one or more datastrips on an application insert. Disclosed is a system for guiding a user in orienting the application insert relative to the datastrip reader so that the datastrips are read in the correct sequence. The digital data utilization apparatus includes an electronic display which displays messages to prompt the user in correctly orienting the application insert relative to the reader. The apparatus also includes guide marks which align with marks on the insert, to further assist the user. Preferably, the application insert also includes a membrane touch pad which overlays a membrane touch pad on the digital data utilization device. The guidance system of the invention (1) minimizes the number of steps required by the user to correctly orient the datastrips to be read by the reader and (2) finishes the guidance sequence so that the touch pad on the application insert overlays the touch pad on the digital data utilization apparatus.

3 Claims, 16 Drawing Sheets

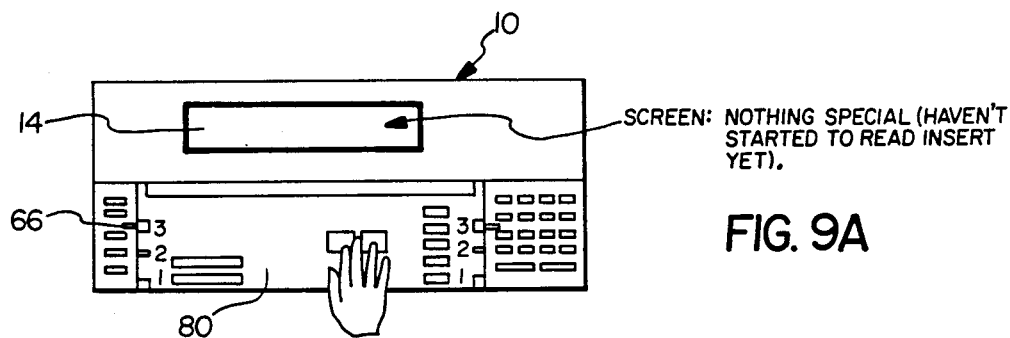
FIG. 9A — SCREEN: NOTHING SPECIAL (HAVEN'T STARTED TO READ INSERT YET).
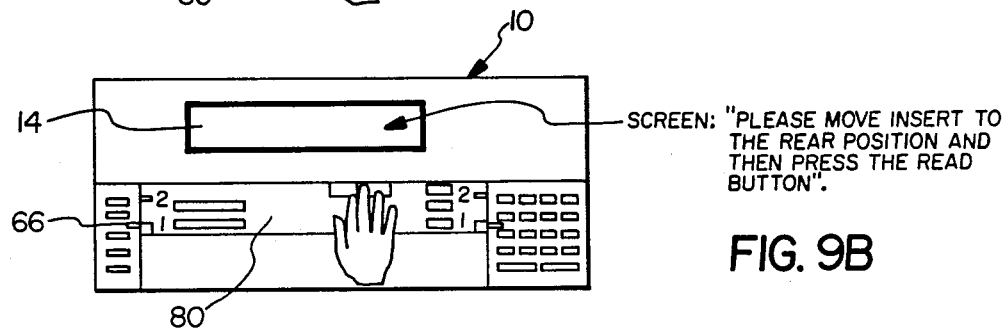
FIG. 9B — SCREEN: "PLEASE MOVE INSERT TO THE REAR POSITION AND THEN PRESS THE READ BUTTON".
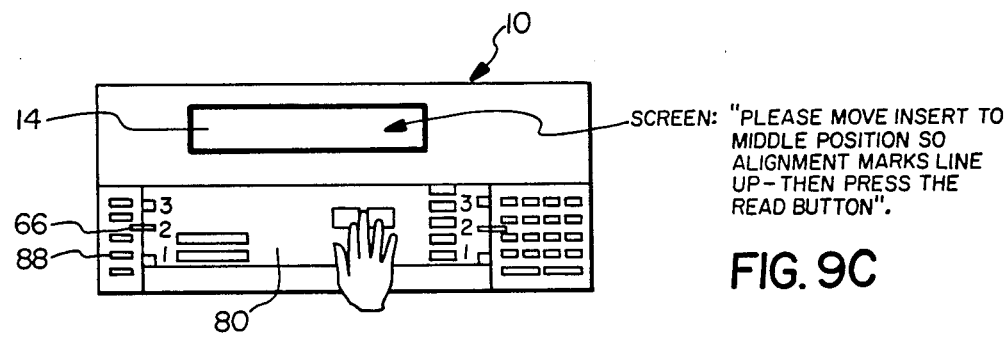
FIG. 9C — SCREEN: "PLEASE MOVE INSERT TO MIDDLE POSITION SO ALIGNMENT MARKS LINE UP — THEN PRESS THE READ BUTTON".
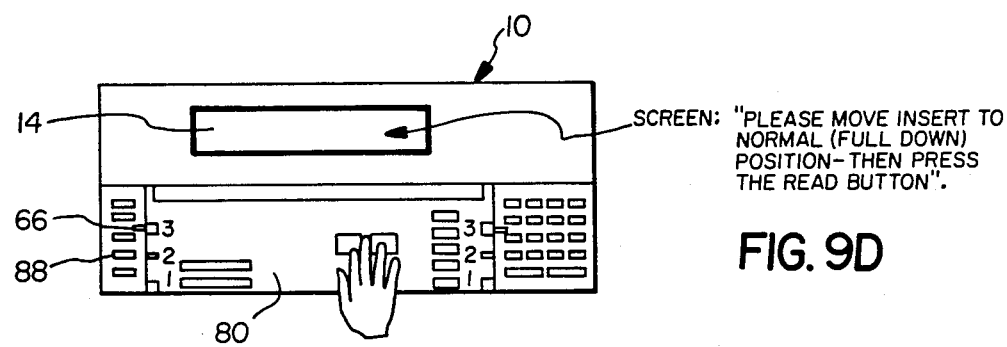
FIG. 9D — SCREEN: "PLEASE MOVE INSERT TO NORMAL (FULL DOWN) POSITION — THEN PRESS THE READ BUTTON".

SYSTEM FOR GUIDING A USER IN ORIENTING AN APPLICATION INSERT HAVING A PLURALITY OF DATASTRIPS RELATIVE TO A DATASTRIP READER

Background of the Invention

This invention relates generally to digital data utilization apparatus and more particularly to a system for guiding a user in orienting an application insert having a plurality of datastrips relative to a datastrip reader of digital data utilization apparatus.

Microprocessor controlled equipment utilizing digital data have become commonplace in industry, in business and in the home. In some equipment (such as the microwave oven, or other consumer appliances), programming of the microprocessor is dedicated to the specific control of the equipment. Thus, the microprocessor is not independently programmable by the equipment user. In other equipment (such as home or personal computers), the microprocessor is the heart of a digital data system which may be independently programmed by the user. Thus, programs for applications such as word processing, database management, file management and financial management are readily available for use in personal computers. Morever, thousands of other programs are available for a wide variety of financial, educational, personal enrichment and entertainment applications.

Major obstacles to the wide acceptability of user programmable digital data utilization apparatus have been the skill and time required to learn to use such apparatus. Moreover, available software often is expensive (costing several hundred dollars or more), and requires considerable time and effort to master the terminology and routines presented in the software. Typically, the home or personal computer includes a floppy disc drive. The software to be utilized in the computer is encoded on a floppy disc which is inserted into the floppy disc drive of the computer. Although versatile, such a programming system is expensive and requires skill to implement.

Other systems have been proposed for making microprocessor controlled apparatus more flexible and capable of performing a variety of functions through the use of interchangeable keyboard overlays, digital cartridges and the like. Thus, for example, U.S. Pat. No. 4,439,757 discloses a computer interactive device including a planar keyboard and a display panel. A resilient keyboard overlay defining specific key applications may be inserted over the planar keyboard, and a program entered into the device by means of a separate cartridge. A similar technique is disclosed in U.S. Pat. No. 4,119,839, entitled KEYBOARD MASK FOR A GENERAL PURPOSE CALCULATOR, issued Oct. 10, 1978. As disclosed in this patent, a general purpose calculator includes a keyboard which is covered by a mask having cutouts registering with keys whose function it is to be preserved. A modification of the functions of the operative keys is effected by means of a separate stored program cassette which is insertable in the calculator. Such systems are disadvantageous because, by separating the keyboard overlay from the data cartridge, one or the other may be lost, rendering the system useless. Moreover, the data cartridges or cassettes are expensive.

Another system which has been proposed for increasing the versatility of digital data utilization apparatus is to provide a dedicated keyboard with a limited number of keys, but to store within the apparatus, software programming for different functions for each key relating to several different applications. Interchangeable keyboard overlays are then placed over the keyboard to provide visual indicia of the functions of the keys for a specific application. The keyboard overlays may also include machine readable codes to identify the specific application represented by the overlay. These systems are disadvantageous in the cost and size of memory needed to stored all of the programs. Moreover, the stored programs are not easily modified by a user. Such systems are disclosed, for example, in U.S. Pat. No. 3,158,317 entitled CONTROL DEVICE, issued Nov. 24, 1964; U.S. Pat. No. 3,560,964 entitled KEYBOARD UNIT, issued Feb. 2, 1971; and U.S. Pat. No. 4,279,021 entitled PROTABLE DATA ENTRY APPARATUS INCLUDING PLRUAL SELECTABLE FUNCTIONAL CONFIGURATIONS, issued July 14, 1981. The latter patent also discloses a programming system wherein a keyboard overlay includes a programmable read only memory which contains programs relating to applications to be performed by the digital data apparatus. Although such a system minimizes the amount of memory required in the digital data device but is disadvantageous in the complexity and cost in providing a programmable read only memory on the overlay.

Another particularly relevant programming system is disclosed in U.S. Pat. No. 4,631,700, entitled MAGNETICALLY CODED SOFTWARE FOR MULTIPURPOSE COMPUTER, issued Dec. 23, 2986, filed Aug. 11, 1983. As disclosed in this patent, a computer keyboard matrix overlay panel includes both indicia indicating the function of keys and other operating instructions, and magnetic and optical datastrips along the edges of the overlay. The datastrips contains data program steps and subroutines which are read into the digital data device. As disclosed in FIG. 2 of this patent, the computer includes a reader 25 having a slot 24 for reading the datastrips when the overlay panel is inserted in an edgewise fashion into the reader slot. FIG. 7 of this patent also discloses an overlay panel which includes a plurality of parallel datastrips which may include mixed media such as optical and magnetic datastrips in one datastrip set. Once the datastrips have been read into the computer, the overlay is placed over the keys to provide a visual indication of the function of keys. The systems disclosed by this patent are disadvantageous in requiring the user to sequentially insert, each of the edges of the overlay panel containing a code strip, into the slotted reader before the panel is registered with the keys on the computer. Moreover, the edges of the panel may be damaged, resulting in loss of data.

SUMMARY OF THE INVENTION

According to the present invention, there is provided a system for guiding a user in orienting an application insert containing one or more datastrips relative to a datastrip reader of digital data utilization apparatus. The system is simple, user friendly and widely applicable for use in industry, business or the home. According to an aspect of the invention, digital data utilization apparatus includes a datastrip reader and a display which displays messages to guide the user in orienting an application insert relative to the reader so that the datastrips are read in the proper sequence. According to a further aspect of the invention, an application insert is provided with alignment marks which can be aligned with corresponding marks on the utilization apparatus to assist the user in orienting the datastrip relative to the reader. One feature of the present invention comprises an application insert which includes a datastrip region where one or more datastrips are located. The location of the datastrips in the datastrip region is selected so that, upon completion of the orientation procedure, the touchpad of the application insert will properly overlay a membrane touchpad of the utilization apparatus.

DESCRIPTION OF THE DRAWINGS

The invention will be described in detail with reference to the drawings in which like elements are provided with like numbers.

FIGS. 8A–8D and 9A–9D are diagrammatic views in illustrating the guidance system of the present invention.

DESCRIPTION OF THE PREFERRED EMBODIMENT

The present invention will be described with respect to a digital data utilization apparatus which is intended to be an information appliance for the consumer market. It will be understood that the present invention may also be used with other digital data utilization apparatus. In general, the information appliance described below includes a microprocessor and memory for storing software relating to operating system routines and built-in application routines. The appliance can also process a wide variety of customized software applications which are provided on application inserts which have an application program in machine readable digitally encoded datastrips. The application insert also includes a touchpad to interface the user with the software application. The machine readably digitally encoded format of the datastrips is preferably that known as the SOFTSTRIP TM SYSTEM developed by Cauzin Systems, Inc., of Waterbury, CONN. The datastrips include a structured pattern of black and white adjacent rectangles which are encoded with the application software and which are read by means of mechanical or electronic, optical scanning devices. It will be understood, however, that other optical and magnetic digital data formats may be used with the present invention.

Figure 1:
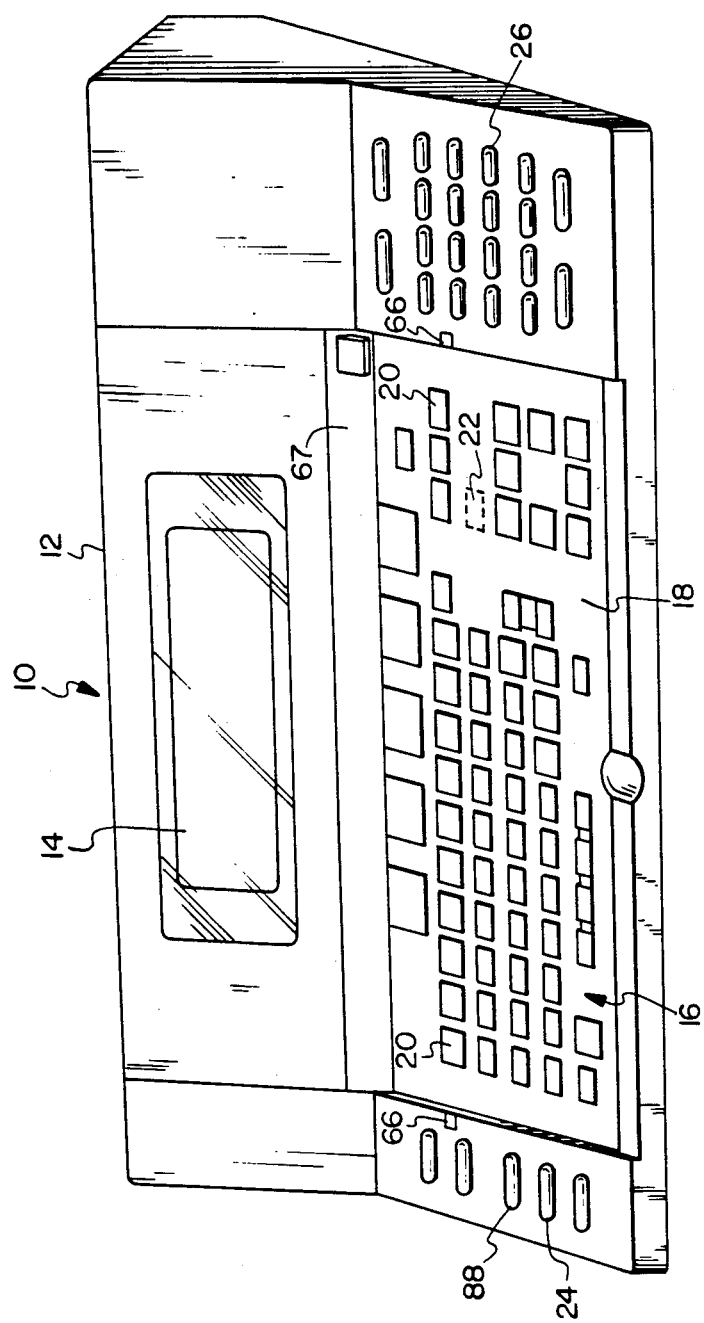
FIG. 1 is a perspective view of a digital data utilization apparatus including an embodiment of the present invention.

Referring now to the Figures, there will be described a preferred embodiment of the present invention. As shown in FIG. 1, a digital data utilization apparatus such as information appliance 10, includes a housing 12 having a liquid crystal display 14. A membrane touchpad 16 is disposed in a recess 18 in housing 12. Touchpad 16 includes an array of touch sensitive keys 20 and touch sensitive positions 22 which may be configured into an application specific touchpad when an application insert is placed over touchpad 16. Keys 20 are visually marked with a full typewriter keyboard and with other keys to access and use software applications built into appliance 10. Appliance 10 is also provided with control keys 24 and arithmetic keys 26.

Figure 5A:
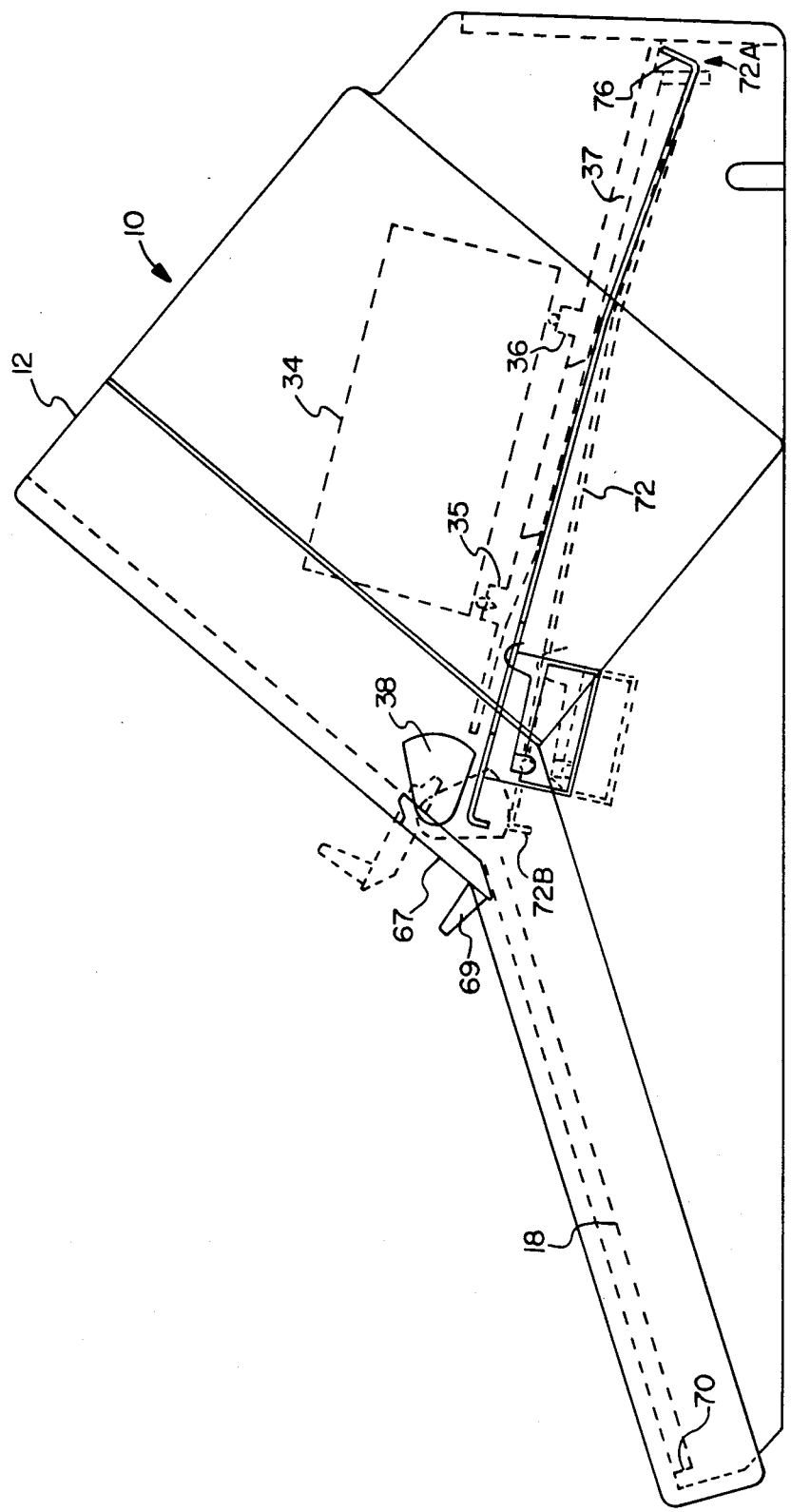
FIGS. 5A and 5B are diagrammatic, elevational and plan views illustrating components of the apparatus of FIG. 1.

An application insert 28 (FIG. 2) contains one or more datastrips 30 having digital data encoded in machine readable format. Insert 28 also has an overlay touchpad 32 having keys which overlay touch sensitive positions on touchpad 16 of appliance 10. Appliance 10 includes a datastrip reader 34 which is mounted for reciprocal movement on tracks 35 and 36 on fixed member 37 (FIG. 5A). A pressure platen 72 is located below member 37 and is cantilevered at end 72A. End 72B of platen 72 is movable between open and closed position by means of cam 38 on door 67. When door 67 is opened (by pushing up on lever 69), end 72B is cammed down by cam 38 (as shown in dashed lines in FIG. 5A). An application insert 34 may now be guided into platen 72 below member 37, to position a datastrip relative to reader 34. When door 67 is closed (by pushing down on lever 69), cam 38 is raised, allowing pressuring platen 72 to press the insert against member 37 so that the datastrip is in the field of focus of reader 34.

Where datastrips 30 on insert 28 are in the SOFTSTRIP TM format, reader 34 can be a mechanical-optical reader such as is used in the Cauzin Softstrip System Reader. This reader optically scans a datastrip, translates its contents into an 8-bit digitally coded signal which is stored in memory in appliance 10. (It will be understood that reader 34 may also be an electronic-optical reader which includes an array of photodiodes or a CCD sensor.) Datastrips 30 may also be in the form of magnetic media, in which case, the reader 34 can be any well known type of magnetic scanning device.

The digital data processing system (FIG. 2) of appliance 10 includes a microprocessor central processing unit (CPU) 40 which is connected to touchpad 16 and display 14 by input/output (I/O) interface circuit 42. CPU 40 is linked to read only memory (ROM) 46; random access memory (RAM) 48 and through reader interface circuit 44 to datastrip reader 34. ROM 46 contains software programs (1) relating to the operating system for the microprocessor (CPU 40) and (2) relating to application functions which are built into appliance 10. RAM 48 has sufficient memory for storing applications and data read from application inserts 28 as well as data associated with the programs stored in ROM 46.

Figure 3A:
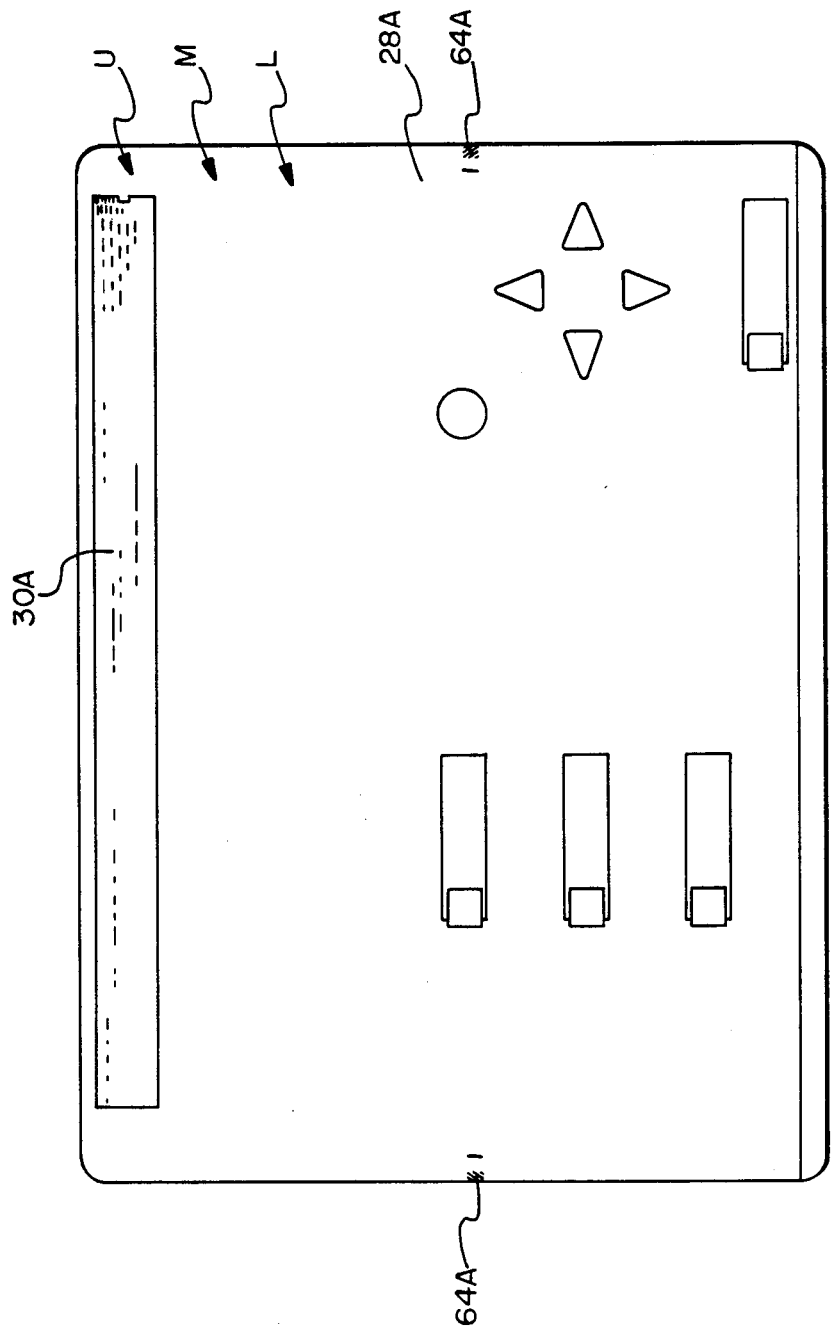
FIGS. 3A, 3B and 3C are plan views of application inserts useful in describing the present invention.
Figure 3B:
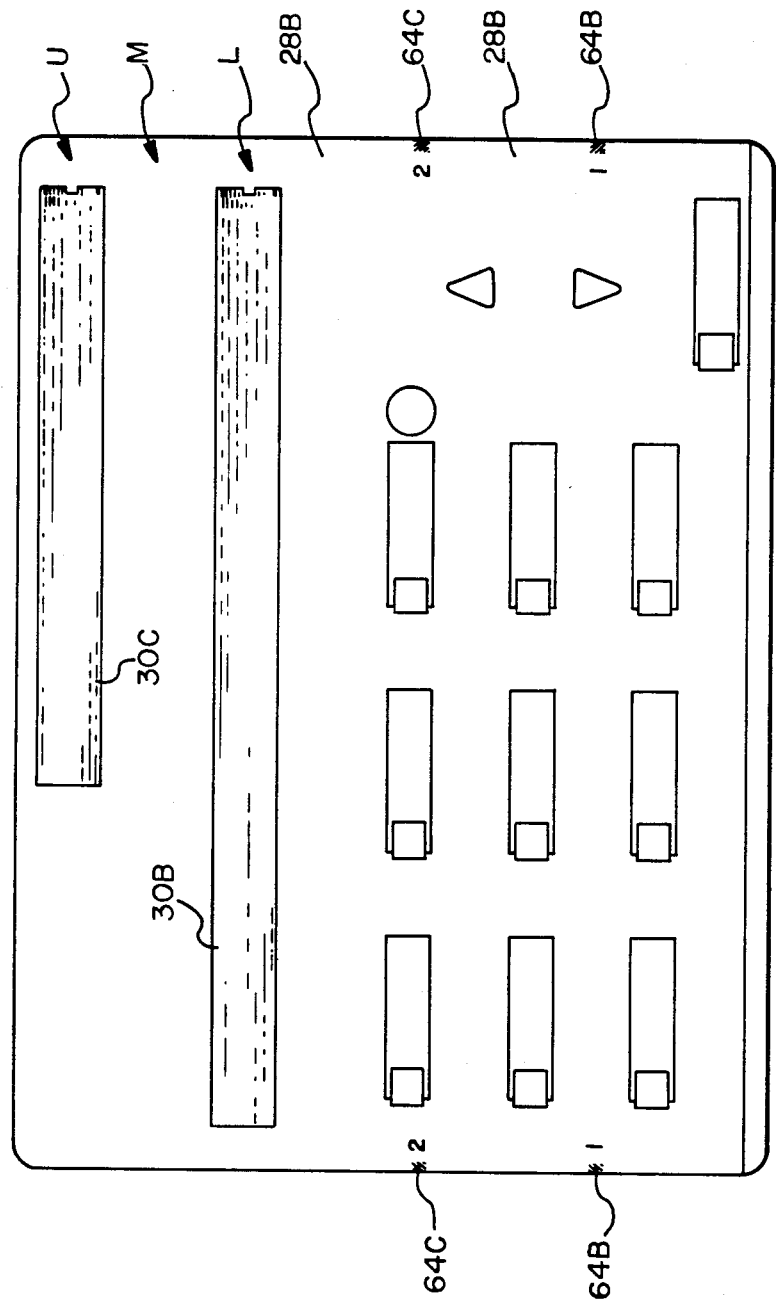
Figure 3C:
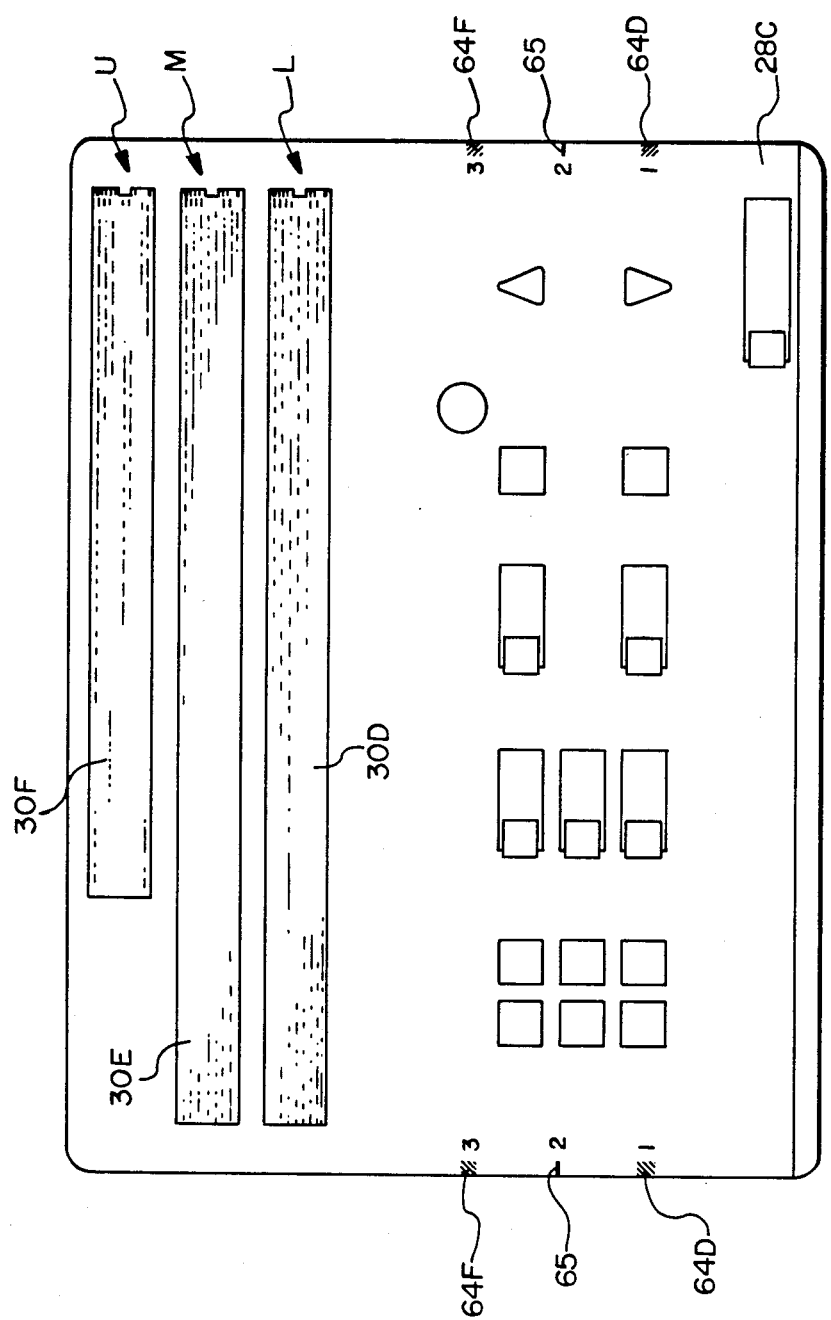

According to an aspect of the present invention, as illustrated in FIGS. 3A–3C, the location of a datastrip or datastrips on an application insert is a function of the number of datastrips on the insert. The location of a datastrip is chosen so that when the last datastrip is positioned relative to the datastrip reader, the touchpad of the application insert overlays the membrane touchpad of appliance 10. As shown, the application insert 28 has a datastrip region for locating three datastrips 30. The region includes an upper location designated U, a middle location designated M, and a lower location designated L. When the application insert (such as insert 28B in FIG. 3B) has two datastrips to be read in sequence, the first datastrip (30B) is located in the L (lower) location and the second or last datastrip (30C)

to be read is located in the U location. This is to be compared with the application insert of FIG. 3A wherein the first and only datastrip is located in the U location. When the application insert (such as insert 28C in FIG. 3C) has three datastrips to be read in sequence, the first datastrip (30D) is located in the L location; the second datastrip (30E) is located in the M location; and the third datastrip (30F) is located in the U location.

Figure 4A:
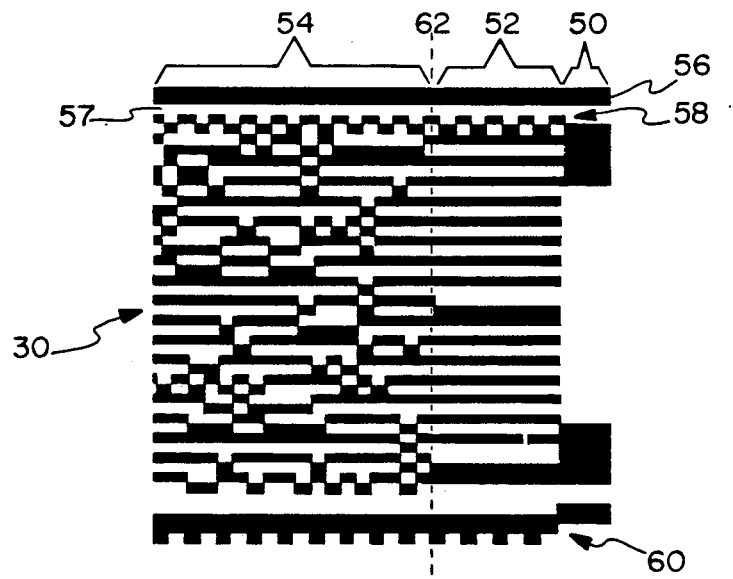
FIGS. 4A and 4B are diagrams illustrating one format of digitally encoded machine readable data useful in the present invention.
Figure 4B:
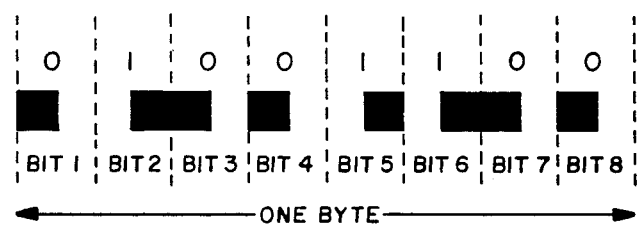

Referring now to FIGS. 4A and 4B, there will be described a preferred format for the optically readable digitally encoded data on the datastrips. As explained above, the preferred format is that developed by Cauzin Systems, Inc. of Waterbury, CONN and referred to as the SOFTSTRIP TM System. This is a specially encoded barcode pattern in which a data bit is defined by dibits, wherein a "zero" is define by sequential black and white squares and a "one" is defined by sequential white and black squares. The encoded digital information is a plurality of parallel, contiguous lines formed of bytes of information, the bites being of uniform height and width. Associated with the encoded information on the printed datastrip, are printed areas serving to preliminarly align the optical reader with the data lines, to maintain that alignment during reading, and to set the vertical and horizontal rates of scanning.

As shown in the exemplary portion of a datastrip in FIG. 4A, the datastrip 30 is oriented to be read by the reader 34 from right to left. The datastrip 30 includes a header portion including a tilt adjustment section 50 and a vertical synchronization section 52 followed by an encoded information section 54. Running along the top edge of the datastrip is a solid start line 56, one dibit wide. After a one bit space 57, there follows a checkerboard pattern alignment guideline 58, which functions as a tilt control line. Running longitudinally along the lower edge of the datastrip 30 is patterned alignment guideline 60. Alignment guidelines 58 and 60 enable the reader 34 to adjust the angle of scanning relative to a transverse data line 62 to the extent necessary to keep them parallel as the datastrip is read.

Referring now to FIG. 4B, there is shown in greater detail an exemplary byte of dibit encoded digital data. As shown, the byte has the value 01001100. Thus, bits 1, 3, 4, 7, and 8 are "zero" bits and are defined by black followed by white squares. Bits 2, 5, and 6 are "one" bits and are defined by white followed by black squares. The number of bytes in a datastrip may vary, for example, from two to eight bytes and in the example given in FIG. 4A, comprises two bytes, whereas the datastrips illustrated in FIGS. 3A-3C have data lines which are six bytes wide.

According to a feature of the present invention, a system is provided for guiding a user in orienting an application insert relative to appliance 10, so that (1) the datastrips on the application insert are read by the datastrip reader in the proper sequence, and (2), at the end of the guidance procedure, the touchpad on the application insert is properly positioned over the corresponding touchpad on the appliance. The user is aided during the guidance procedure by positioning guides 64 and alignment marks 65 on the application insert 28 and complementary alignment marks 66 on appliance 10 (see FIG. 2). The user is also aided during the guidance procedure by messages on the display screen 14 of appliance 10. These messages are produced in response to the reading of guidance data contained in each datastrip at the beginning of the encoded information section 54. Such guidance data includes, for example, the number of datastrips on the application insert and the sequence number of the datastrip being read.

Figure 2:
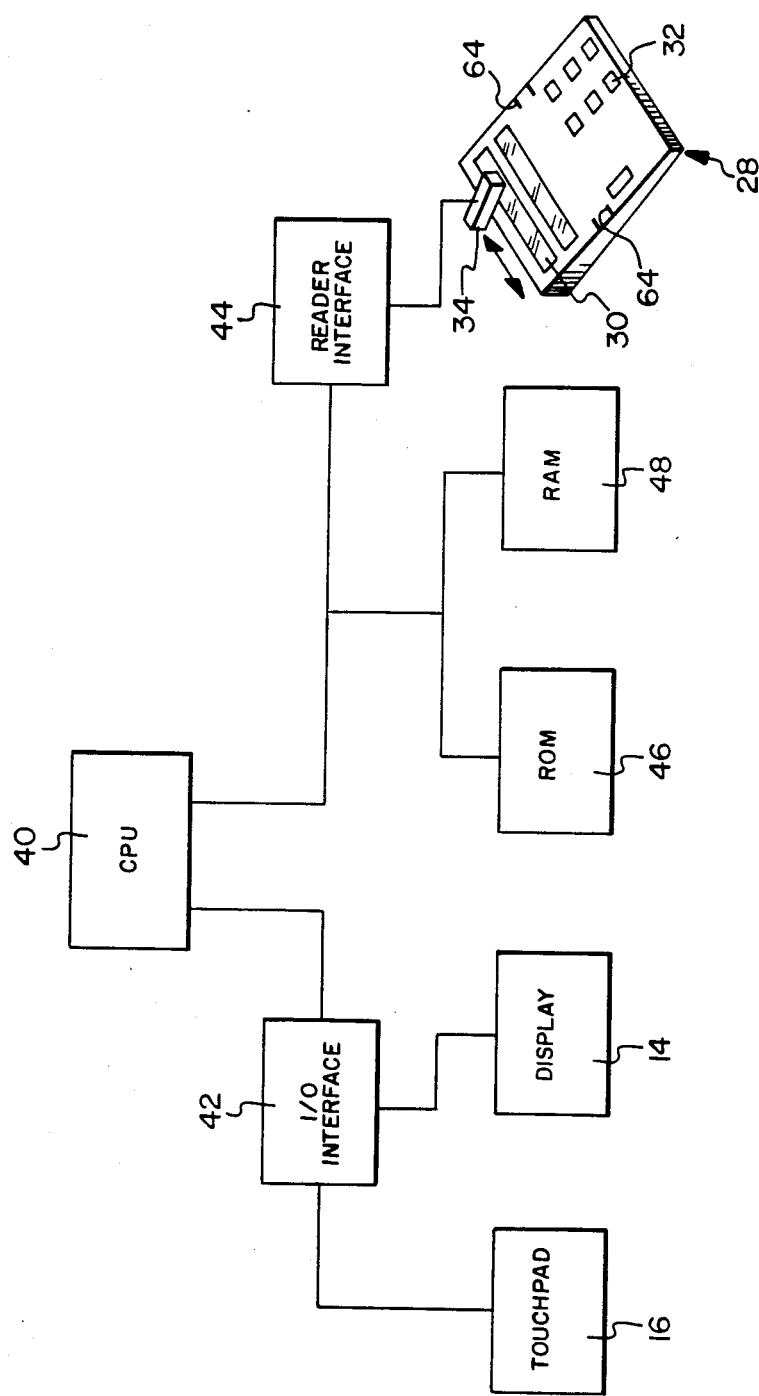
FIG. 2 is a block schematic diagram useful in describing the operation of the apparatus of FIG. 1.
Figure 6A:
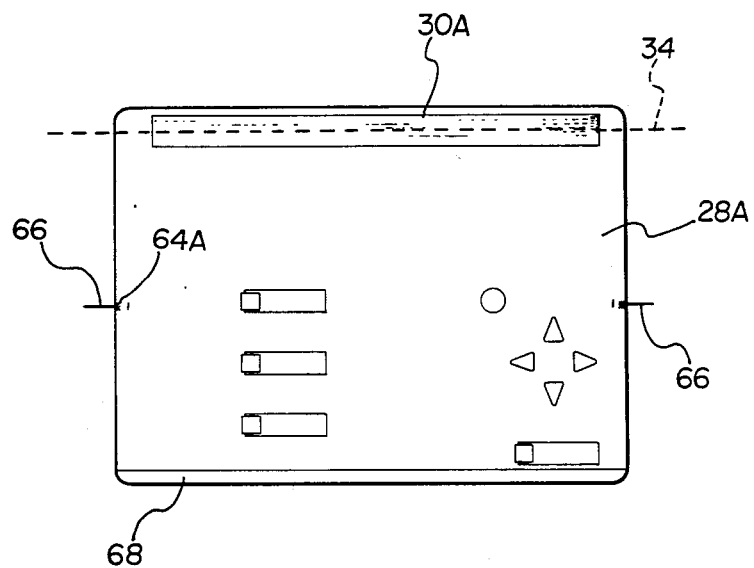
FIGS. 6A, 6B, 6C and 7A, 7B and 7C are diagrams illustrating guidance of the application inserts of FIGS. 3A, 3B and 3C relative to a datastrip reader.

Reference is now made to FIGS. 6A-6C and 7A-7C, for an explanation of an embodiment of the system application insert of the present invention. As shown in FIG. 6A, the application insert 28A has only one datastrip 30A. The user opens door 67 on appliance 10 and places insert 28A between member 37 and pressure platen 72 so that the lower edge 68 of insert 28A is positioned against stop 70 (FIG. 5A) of recess 18. The application insert 28A is then properly positioned within recess 18 so that the touchpad on application insert 28A overlays the membrane touchpad 16 of appliance 10. Datastrip 30A is also properly oriented relative to reader 34 for reading of the data on datastrip 30A into RAM 48 (FIG. 2). In this position the positioning guides 64A on application insert 28A are aligned with marks 66 on appliance 10.

Figure 5B:
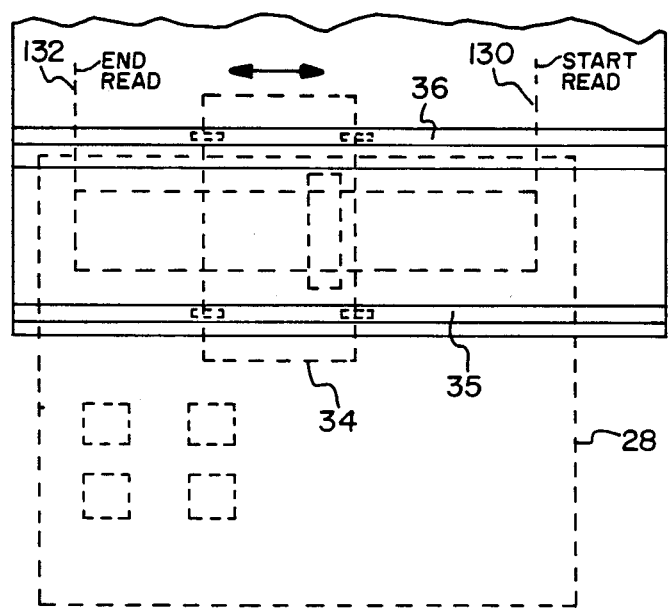

As shown in FIG. 5B, reader 34 starts reading a datastrip at the "start read" position 130. Reader 34 moves along tracks 35 and 36 from right to left until the "end read" position 132 is reached. At this point, all the data on the datastrip has been read into RAM 48 and reader 34 is moved back to the "start read" position, to be ready to read another datastrip.

Figure 6B:
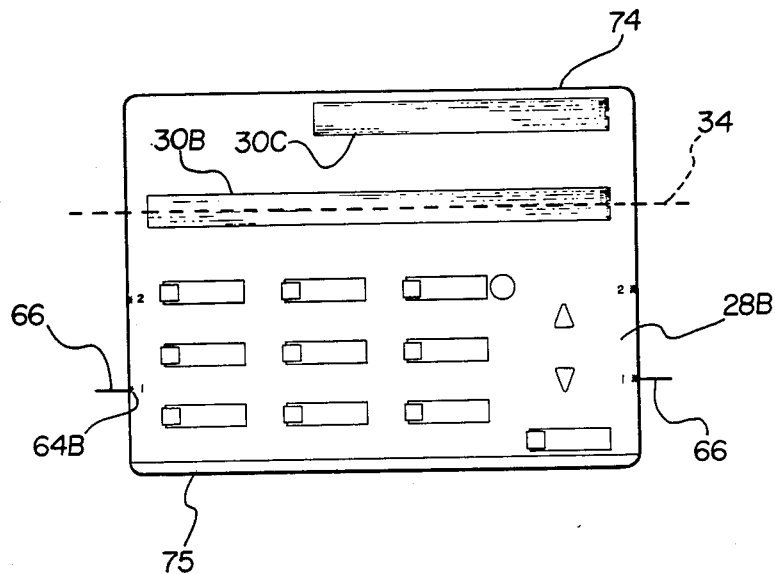
Figure 6C:
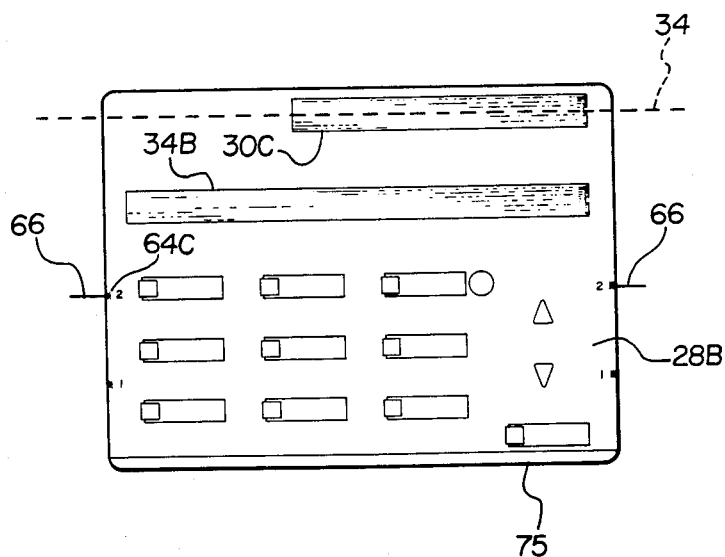

As shown in FIG. 6B, the first datastrip 30B on insert 28B to be read is located in the L location on insert 28B. Insert 28B is oriented as follows: the user places the application insert 28B all the way into appliance 10 onto pressure platen 72 until the back edge 74 abuts against the rear stop 76 of platen 72. In this position, the first datastrip 30B of application insert 28B is positioned below reader and the #1 positioning guides 64B on insert 28B are lined up with alignment marks 66 on appliance 10 (see FIG. 6B).

After the datastrip 30B has been read by reader 34, the display 14 directs the user to orient the insert 28B (FIG. 6C) so that the front endge edge 75 abuts against the front stop 70 of appliance 10. In this position, the #2 positioning guides 64C of insert 28B are now lined up with marks 66 on appliance 10. Reader 34 then reads datastrip 30C. In this position also, the insert touchpad overlays the appliance touchpad so that the user can run the application program.

Figure 7A:
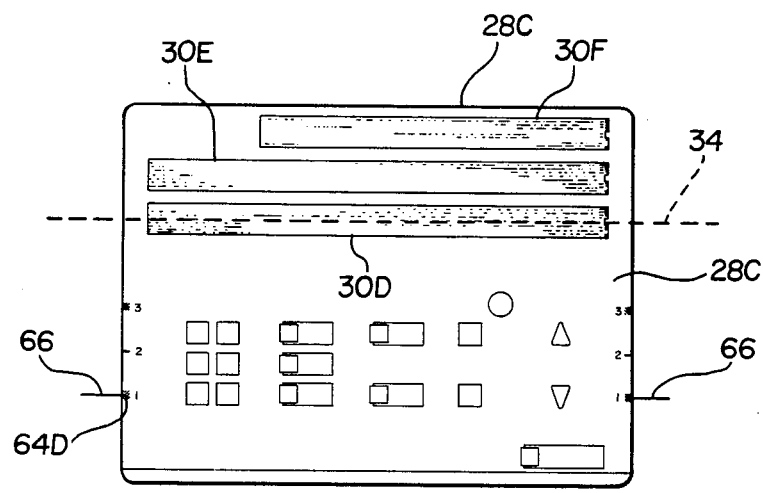
Figure 7B:
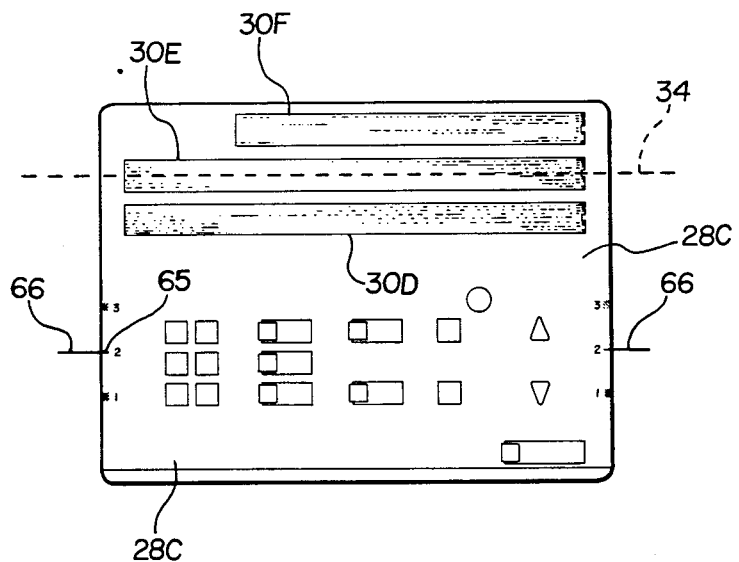
Figure 7C:
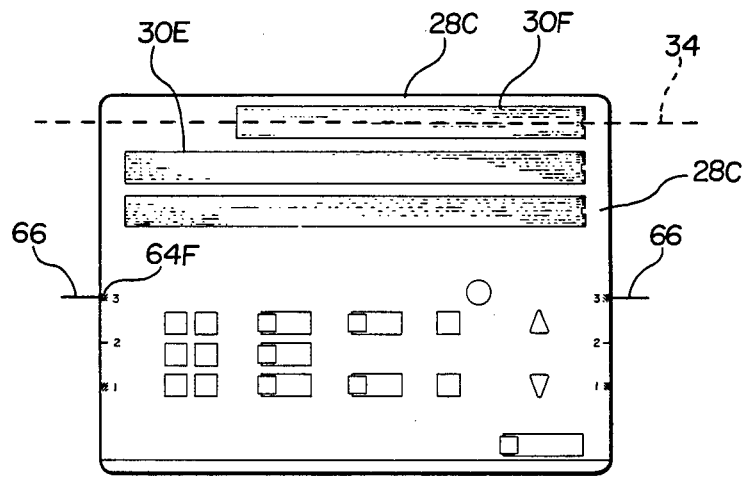

Referring to FIGS. 7A-7C, application insert 28C is shown to have three datastrips (30D, 30E and 30F) to be read by reader 34 of appliance 10. As shown in FIGS. 7A, the user orients application insert 28C relative to appliance 10 until the upper edge of insert 28C abuts against stop 76 (FIG. 5A). In this position, datastrip 30D is positioned below reader 34 and the #1 positioning guides 64D on insert 28C are lined up with appliance marks 66. After the reader 34 has read datastrip 30D, the user moves the insert now to align the #2 alignment marks 65 with appliance marks 66 (FIG. 7B). Reader 34 then reads datastrip 30E into RAM 48. Finally, (see FIG. 7C) the user moves application insert 28C against the front stop 70 (FIG. 5A) in order to position datastrip 30F under reader 34. In this position, the #3 positioning guides 64F of insert 28C are lined up with appliance marks 66. In addition, the touchpad of insert 28C overlays touchpad 16 of appliance 10. Reader 34 then reads datastrip 34 into RAM 48.

According to a feature of the present invention, the user of appliance 10 is provided with messages on display 14 as a guide in properly orienting an application insert relative to appliance 10. The user will also be guided through the correct sequence should the wrong datastrip be positioned under reader 34. The messages displayed when a user correctly orients application insert having three datastrips (such as shown in FIG. 3C) is illustrated in FIGS. 8A-8D.

Figure 8A:
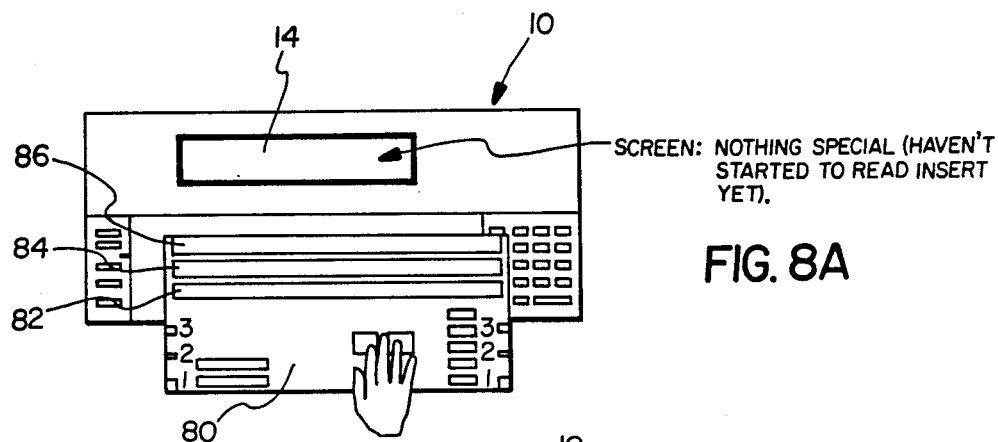
Figure 8B:
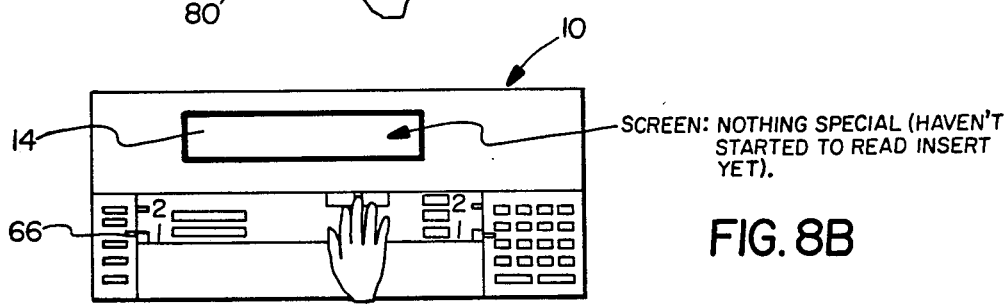
Figure 8C:
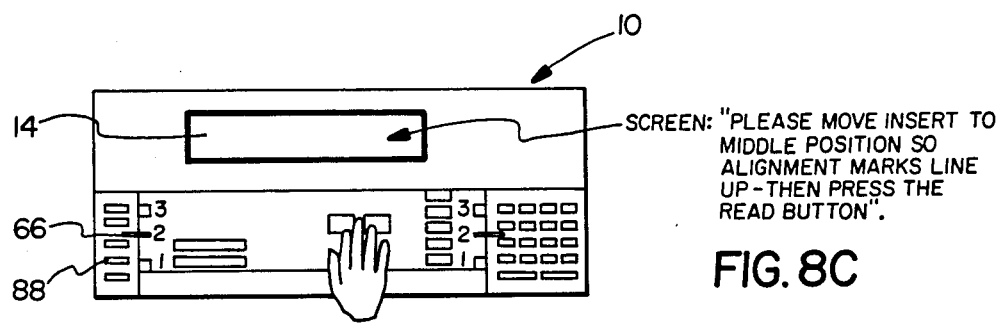
Figure 8D:
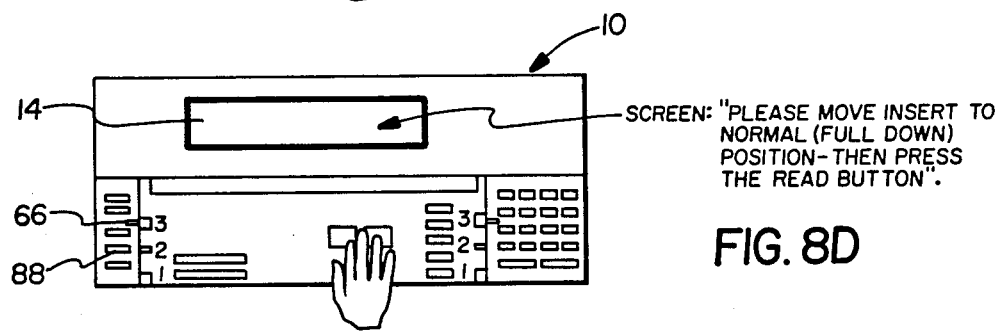

In FIG. 8A, the user is shown about to insert application insert 80 into information appliance 10. Nothing special is shown on display 14 since the datastrip reader of appliance 10 has not yet started to read the insert. In FIG. 8B, the user has correctly placed the insert 80 against the rear stop so that the first datastrip 82 is positioned under reader 34 (the positioning guides labeled "1" on insert 80 are then lined up with marks 66 on appliance 10). Still nothing is shown on the screen of display 14. In FIG. 8C, after reader 34 has completed reading of this datastrip (which is correctly identified as the first datastrip in a sequence of three datastrips to be read), the display 14 displays the message "Please move insert to middle position so alignment marks line up then press the READ button". The user then aligns the alignment marks labeled "2" on insert 80 with alignment marks 66 on appliance 10 and presses the read button 88.

After the reader 34 has read the second datastrip in the sequence, display 14 displays the message "Please move insert to normal (full down) position—then press the READ button". The user then moves the insert against front stop 70 (positioning guides marked 3 are now lined up with marks 66), presses read button 88 and the reader 34 reads the third and last datastrip, datastrip 86. The software application is now ready to run since the keypad of insert 80 properly overlays the membrane touchpad of appliance 10.

If the user incorrectly orients an application insert 28 relative to reader 34 of appliance 10 so that the datastrip being read is out of sequence, appliance 10 is programmed to assist the user through displayed messages. Referring to FIG. 9A, the user is shown to have positioned insert 80 so that the wrong datastrip is positioned under reader 34. When the datastrip reader 34 reads the guidance information contained in the header for this datastrip, CPU 40 determines that the wrong datastrip is being read since it is the third datastrip in a sequence of three datastrips and therefore is being read out of order. A message is displayed on display 14 (FIG. 9B), "Please move insert to the rear position and then press the READ button". The user then moves the application insert 80 so that its back end abuts the rear stop 76 and presses read button 88. Reader 34 then reads the correct datastrip 82, the first datastrip in the sequence of three datastrips. (Positioning guides "1" are lined up with marks 66 instead of incorrect marks "3" as in FIG. 8A)

After the first datastrip is read, the display 14 displays the message (FIG. 9C), "Please move insert to the middle position so alignment marks line up—then press the READ button". The user then positions insert 80 so that alignment marks "2" are aligned with alignment marks 66 on appliance 10. The user then presses button 88. Reader 34 reads the data on datastrip (FIG. 9C). Display 14 then displays the message (FIG. 9D), "Please move insert to normal (full down) position— then press the READ button". The user now moves the insert against the front stops 70 (the #3 positioning guides then line up marks 66 on appliance 10) and presses the button 88. Reader 34 reads the last datastrip and the application is now ready to run.

Figure 10A:
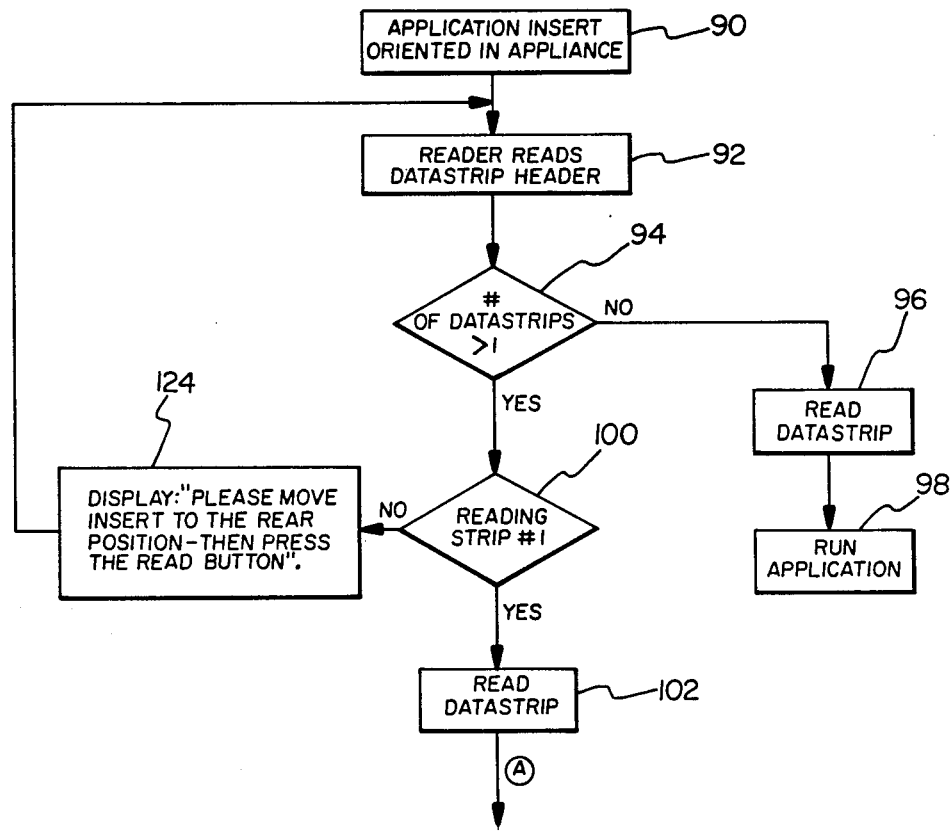
FIGS. 10A and 10B are a flow diagram useful in understanding the present invention.
Figure 10B:
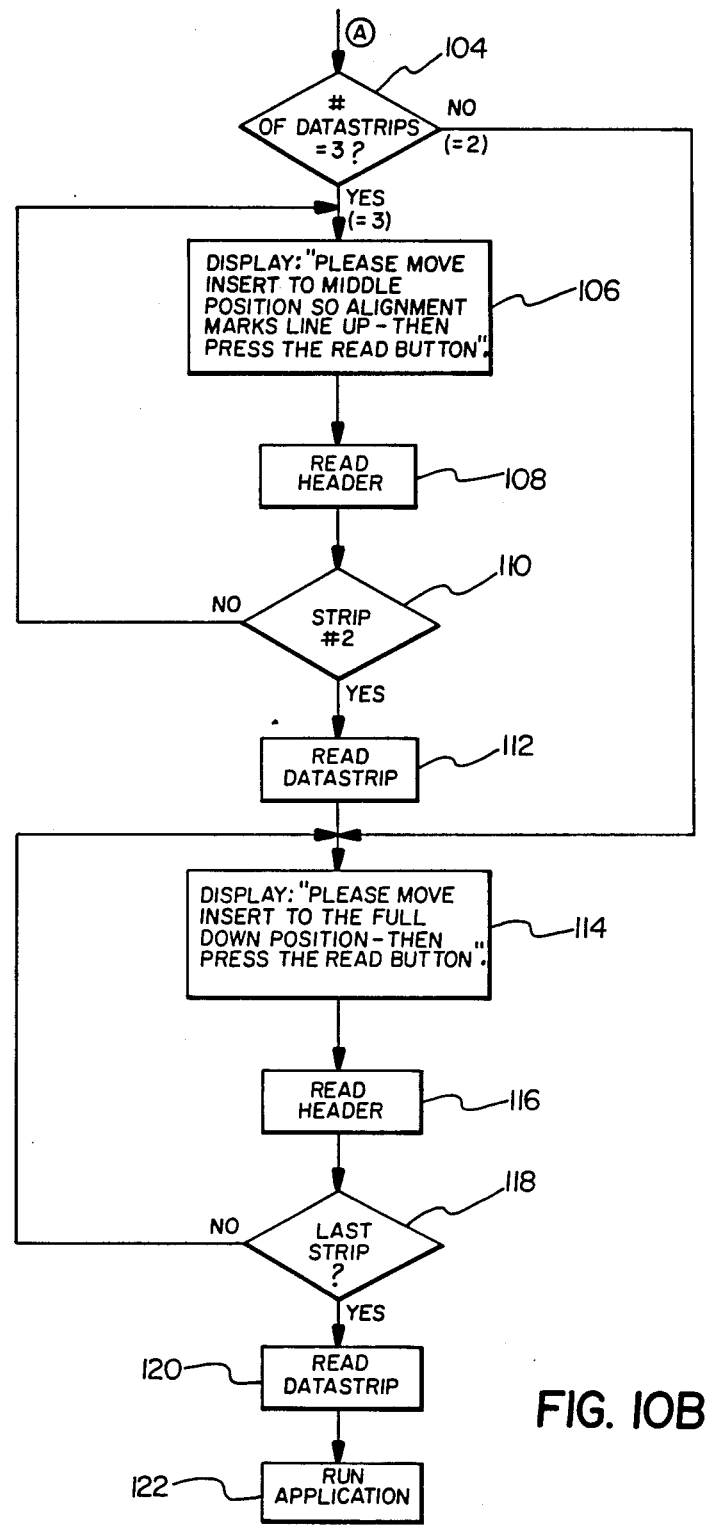

Referring to FIGS. 10A and 10B, there is shown a flow diagram useful in describing operation of the system of the present invention. The user places an application insert in appliance 10, (box 90) and the reader reads guidance information from the beginning of the datastrip positioned under reader 34 (box 92). CPU 40 then decides whether or not the number of datastrips indicated by the datastrip header is greater than one (diamond 94). If the answer is "no", the datastrip being read is identified as the only datastrip on the application insert. Reader 34 proceeds to read the datastrip (box 96). The application contained on the application insert is then run (box 98).

If it is determined (diamond 34) from the header of the first datastrip read, that the number of datastrips contained on the application insert is greater than one, CPU 40 decides whether the datastrip being read is being used in correct sequence, i.e., the first one of several datastrips to be read (diamond 100). If the answer is "yes", then the datastrip is read (box 102). CPU 40 now determines whether the number of datastrips to be read is equal to two or three. If the number is "three", then CPU 40 causes a message to be displayed on display 14 as follows: "Please move insert to middle position so alignment marks line up—then press the READ button" (box 106). After the user has completed these instructions and pressed the read button, reader 34 will read the second datastrip (reader box 108). If the datastrip is in sequence (diamond 110) the second datastrip is read (box 112). CPU 40 then causes the following message to be displayed on display 14 of appliance 10—"Please move insert to full down position—then press READ button" (box 114).

Thereafter, the third datastrip reader is read (box 116), and checked for sequence (diamond 118), then the datastrip is read and then the application is run (box 122).

If the decision at diamond 104 is that the number of datastrips on application insert is equal to two, the routine skips to boxes 114, 120 and 122.

If the decision at diamond 100 is that the datastrip being read is not in correct sequencing, CPU 40 causes display 14 to display the following message—"Please move insert to the rear position and then press READ button" (box 124). After the user has pressed the read button, reader 34 again reads the datastrip reader (box 92) and the routine is continued at diamond 94. Similarly to the correct strip decision at diamond 100, decisions are also made at diamonds 110 and 118 which cause the display 14 to redisplay the correct direction 106 or 114.

The invention has been described in detail with particular reference to a preferred embodiment thereof but it will be understood that variations and modifications can be effected within the spirit and scope of the invention.

What is claimed is:

1. A digital data system comprising:
   an application insert having one or more digitally encoded datastrips located adjacent to and parallel with an edge of said application insert, wherein each of said datastrips includes guidance information at the beginning of the datastrip; and
   digital data utilization apparatus including an electronic display, a reader for reading the guidance information contained at the beginning of a datastrip on an application insert which has been oriented relative to said reader for reading said datastrip, and control means for processing the guidance information read by said reader from said datastrip and for displaying, on said electronic display, messages which guide a user of said system to correctly orient said application insert relative to said reader so that said reader reads said datastrips on said insert in the correct sequence.

2. The digital data system of claim 1 wherein said application insert includes at least two datastrips and wherein said control means of said digital data utilization device causes a message to be displayed on said electronic display, indicating that an incorrect datastrip has been oriented relative to said reader and guiding a system user in orienting the correct datastrip to be read by said reader.

3. The digital data system of claim 1 wherein said application insert and said digital data utilization apparatus include respective alignment marks to guide the system user, in conjunction with the messages displayed on said electronic display, in correctly orienting said application insert relative to said reader so that said reader reads said datastrips in the correct sequence.

* * * * *